United States Patent [19]

Stahura

[11] 4,249,650

[45] Feb. 10, 1981

[54] BELT CLEANER MOUNTING ARRANGEMENT

[75] Inventor: Richard Stahura, Indiana, Pa.

[73] Assignee: Martin Engineering, Neponsit, Ill.

[21] Appl. No.: 86,645

[22] Filed: Oct. 22, 1979

Related U.S. Application Data

[63] Continuation of Ser. No. 902,351, May 3, 1978, and a continuation of Ser. No. 757,908, Jan. 10, 1977.

[51] Int. Cl.³ ............................................. B65G 45/00
[52] U.S. Cl. .................................... 198/499; 15/256.5
[58] Field of Search ............................. 198/497–499, 198/494, 827, 782; 15/256.5, 256.51, 256.53; 74/230; 193/37; 29/129

[56] References Cited

U.S. PATENT DOCUMENTS

3,674,131  7/1972  Matson ................................. 198/499
4,019,217  4/1977  Schinle ............................. 15/256.53

*Primary Examiner*—Bruce H. Stoner, Jr.
*Assistant Examiner*—Douglas D. Watts
*Attorney, Agent, or Firm*—McWilliams, Mann & Zummer

[57] ABSTRACT

A track mounted conveyor belt cleaner wherein individual belt scraper blades are affixed to sleeve members which slide linearly along a support member positioned generally transverse to the direction of travel of the belt to be cleaned. The sleeves are slidably mounted on the support member such that they may freely slide from one end to the other but are fixed against either rotational or vertical movement and provide for repair or replacement of wiper blades without requiring conveyor belt shutdown.

10 Claims, 7 Drawing Figures

U.S. Patent Feb. 10, 1981 Sheet 1 of 2 4,249,650
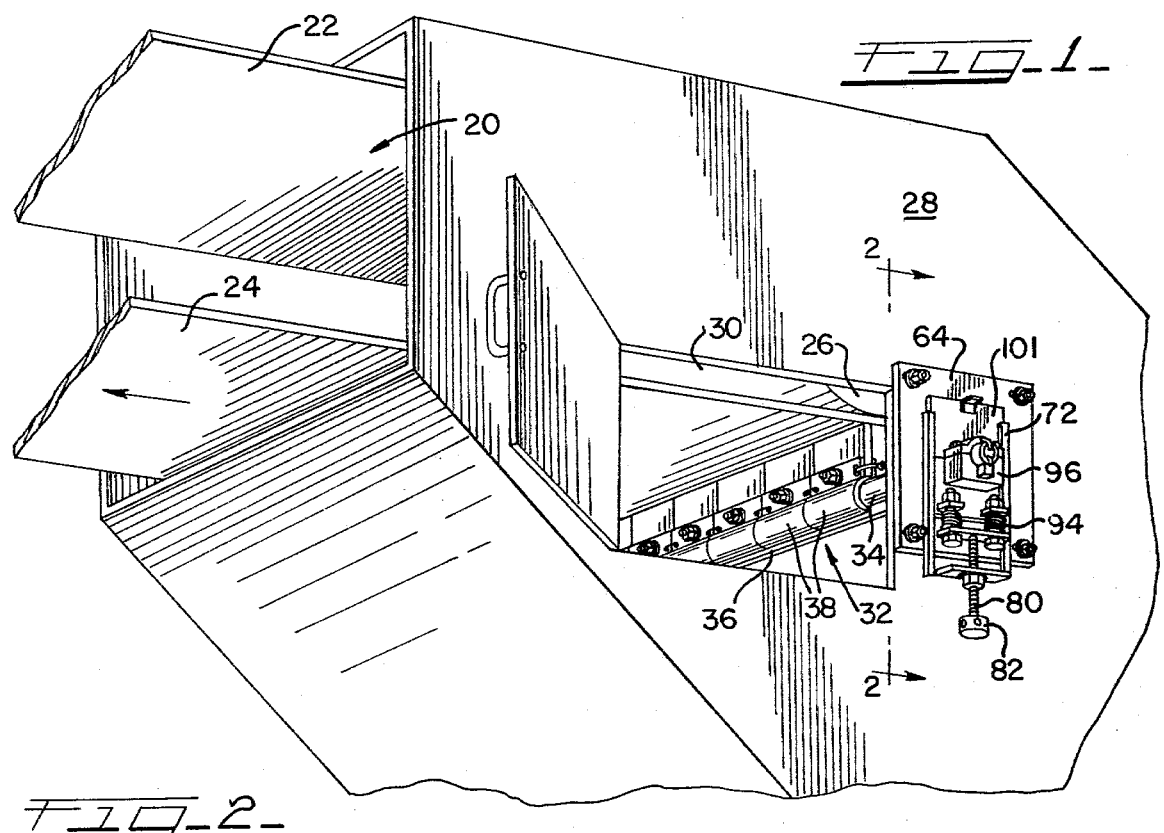
FIG_1_
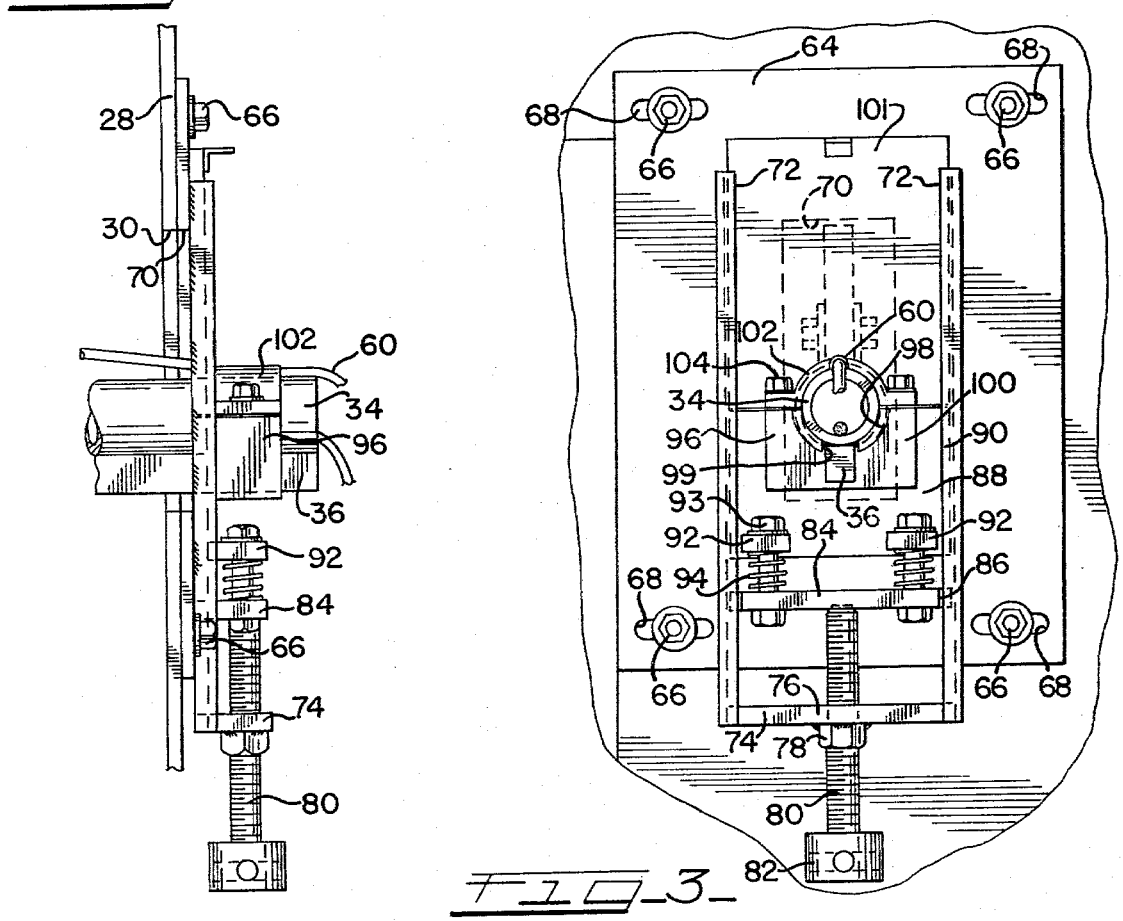
FIG_2_
FIG_3_

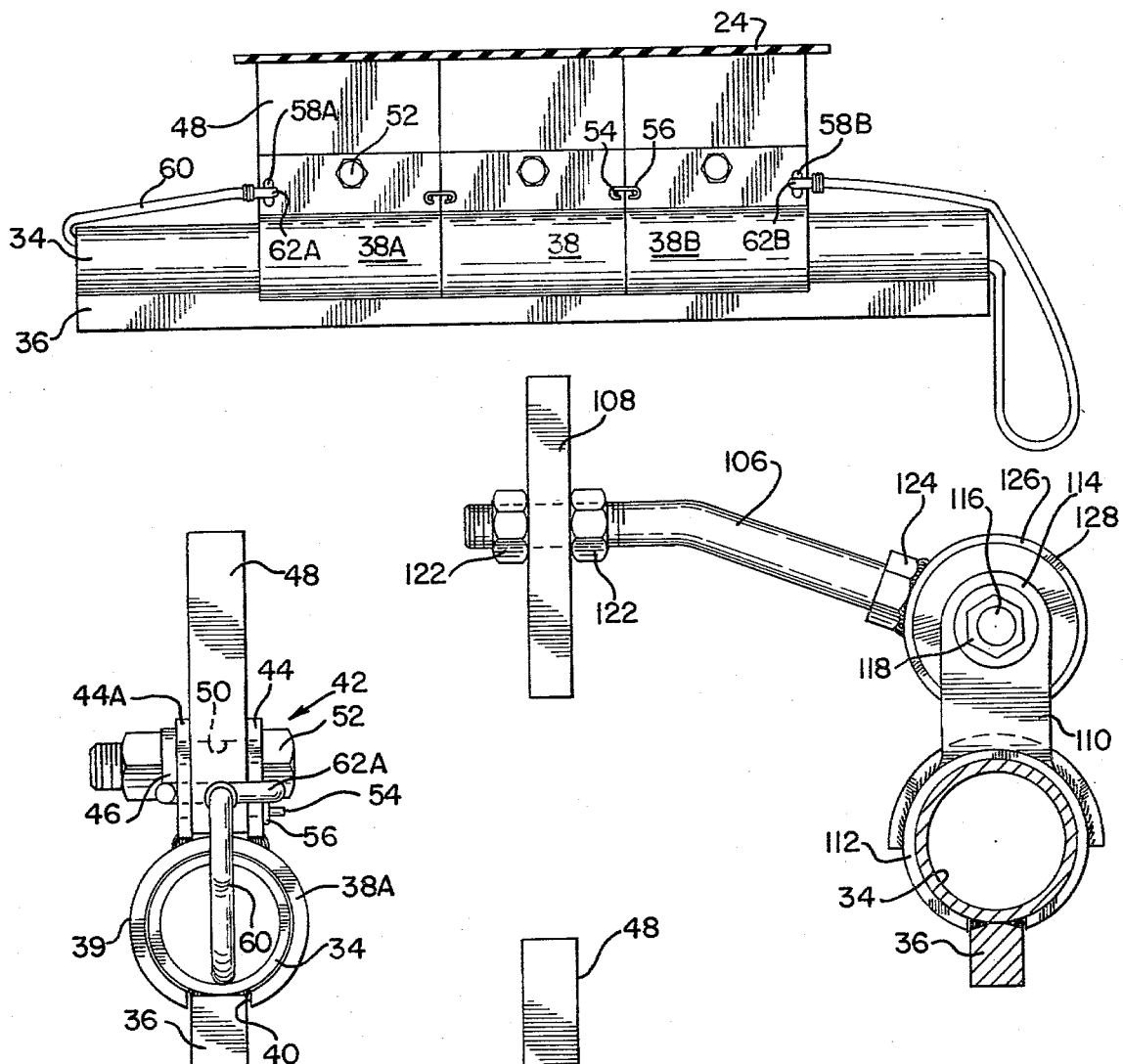

BELT CLEANER MOUNTING ARRANGEMENT

This is a continuation of application Ser. No. 902,351 filed May 3, 1978, and a continuation of application Ser. No. 757,908 filed Jan. 10, 1977.

BACKGROUND OF THE INVENTION

Many varied arrangements have been provided in the prior art for mounting conveyor belt cleaners on a support member mounted transverse to the direction of conveyor belt travel. All of these arrangements have presented certain problems with respect to repair or replacement of individual blade elements.

Sometimes the wiper blades are carried on one end of a torsion spring. The other end of the spring is affixed to a transverse support. Such an arrangement is illustrated in U.S. Pat. No. 3,342,312. As the wiper blades wear, periodic replacement is required. Occasionally a wiper blade becomes damaged during regular use and the individual blade must be replaced. In either of these situations the conveyor belt must be shutdown and one of two alternatives is presented to the belt operator. If access permits, the operator may be able to disconnect the individual wiper blades from the support shaft and replace them as needed. In the majority of situations however, access to the underside of the conveyor belt is limited and the entire support shaft must be removed from the side of the conveyor housing. This is often difficult to accomplish because of limited space. The time lost for conveyor shutdown due to wiper blade replacement is a critical factor to be considered.

SUMMARY OF THE INVENTION

The present invention provides a track mounted conveyor belt cleaning arrangement whereby one or all of the wiper blades can be replaced without requiring conveyor belt shutdown. The operator merely lowers the support shaft by means of an adjusting mechanism and pulls on a flexible cable causing individual wiper blades and the sleeves on which they are mounted to slide along the support member to one side or the other. Individual sleeves are removed from the shaft, the wiper blades are replaced, the sleeves are mounted back on the support member and the wiper blades returned to their operative positions. Such an arrangement eliminates removal of the entire support shaft from the conveyor housing, provides for easy blade replacement, requires minimum access space and greatly speeds the replacement process eliminating conveyor belt downtime.

DESCRIPTION OF THE DRAWINGS

FIG. 1 is a fragmentary perspective view of the belt conveyor and cleaning and mounting arrangement of the present invention.

FIG. 2 is an end view taken along the lines 2—2 of FIG. 1 showing one portion of the mounting arrangement.

FIG. 3 is a side view of the embodiment shown in FIG. 2.

FIG. 4 is an end view in detail showing a portion of the mounting arrangement.

FIG. 5 is a side view of the embodiment shown in FIG. 4 taken from the left side thereof.

FIG. 6 is a side view showing a modified form of a portion of the mounting arrangement.

FIG. 7 is a side view showing another modified form of the mounting arrangement.

DESCRIPTION OF THE PREFERRED EMBODIMENT

FIG. 1 shows, in perspective, the discharge end portion of a conveyor belt 20, here selected as representative of typical conveyors, having an upper or delivery run 22 and a lower or return run 24, the belt being trained as usual about a drum or roller 26 conventionally carried in a frame (not shown) within a housing 28. The housing is provided with an access opening 30 which allows the operator to inspect the belt cleaning operation. Frequent inspection is important to insure continuous operation of the belt cleaner.

A belt cleaner assembly 32 is provided including a linearly extending support member 34 which is disposed below and substantially transverse to the direction of travel of the return run 24 as indicated by the arrow.

As best illustrated in FIGS. 4 and 5 the support member 34 consists of a tubular hollow shaft with a radially extending projection 36 extending from beneath its lower surface along substantially the entire length of the shaft. Slidably carried on the shaft 34 are a plurality of sleeve members 38. For purposes of illustration three such sleeve members 38A, 38 and 38B are shown in FIG. 4 but the number will vary depending upon the width of the belt to be cleaned, the width of the scraper blades and a number of other factors.

As shown in FIG. 5 each of the sleeve members 38 is formed of a generally circular hollow body 39 having an internal diameter slightly larger than the outside diameter of the support shaft 34. The sleeve member 38 defines a channel 40 at its lower end having a width slightly greater than the width of the projection 36. Affixed to the upper end of the sleeve is a mounting bracket 42, here shown as a pair of linearly extending flange sections 44 and 44A. An aperture 46 is provided on both of the flange sections. Disposed between the flange sections is a belt cleaner blade 48 which defines an aperture 50 therethrough. The wiper blade 48 is positioned such that the aperture 50 is aligned with the apertures 46 and a fastener 52 is inserted therethrough. In FIG. 5 the fastener is illustrated as a bolt with a nut and lockwasher but any suitable fastening arrangement can be used to secure the wiper blade to the mounting bracket.

As best shown in FIG. 4, the individual sleeve members 38 are connected together for simultaneous movement along the support shaft 34. This is accomplished by pins 54 which extend outwardly from the flange section 44 and links 56 which overlie and interconnect the pins 54 of adjacent sleeve members.

The sleeve members 38 and support shaft 34 are designed such that the sleeve members and the wiper blades connected thereto may freely slide along the shaft from one end to the other. Rotation of the sleeves with respect to the shaft is prevented by contact between the sides of the sleeve 38 which form the channel 40 and the sides of the projection 36. This is important to insure that the operative face of the wiper blade 48 contacts the lower face of the return run 24 at the predetermined angle. Vertical movement between the sleeve 38 and the support shaft 34 is also prevented by this design. This arrangement also prevents cocking of the blade 48 with respect to the shaft 34.

The sleeve members 38A and 38B which are to occupy the outermost positions on the support shaft 34 are each provided with an aperture, 58A and 58B repsectively. A flexible cable 60 is shown extending through the hollow center of the support shaft 34. The cable 60 includes snap hooks 62A and 62B affixed at each end thereof for engagement with the apertures 58A and 58B respectively.

The details as to the mounting of the shaft 34 with respect to the housing 28 are best illustrated in FIGS. 2 and 3. As previously indicated an access opening 30 is provided in one side of the housing 28. A mounting plate 64 is releasably affixed to the housing 28 by means of four fasteners 66 which extend through slotted apertures 68 defined in the plate 64. The plate also defines an internal opening 70. A pair outwardly extending, inwardly curved channel members 72 are disposed on the face of the plate 64 parallel to the side edges of the opening 70. A lateral support 74 is connected at each end to the channel members 72 at their lower end. The lateral support includes an opening 76 extending therethrough. A hex nut 78 is welded to the support on its lower surface and a threaded shaft 80 with a handle 82 at one end extends through the nut 78 and the opening 76.

A second lateral support 84 is positioned parallel to and displaced upwardly from the support 74. The support 84 has end flanges 86 which slide within the channel members 72 A support plate 88 is also designed with end flanges 90 to slide vertically within the channel members 72. The plate includes at its lower end a pair of projections 92 which extend outwardly from the face thereof and define an opening therethrough. A pair of nut and bolt fasteners 93 extend through support 84 and projections 92 with a pair of coil springs 94 disposed between. A bearing support 96 is affixed to the plate 88 and includes a semi-circular collar section 98 extending outwardly from the plate and defining a groove 99 therein. The support 96 has a pair of threaded bores 100 one disposed on each side of the collar section 98. Another plate 101 is slidably disposed within the channel members 72 and includes a mating collar section 102 extending outwardly therefrom adapted to be secured to the support 96 by bolts 104.

FIG. 6 illustrates a modified embodiment of the invention in which each wiper blade is carried on a torsion spring arm as opposed to being mounted directly to the sleeve. A plurality of arms 106 radiate from the axis of the support 34. Each arm carries a scraper blade 108 at its outer end. A mounting bracket 110 is secured to the sleeve member 112 which is axially slidable on the support 34 as previously described for the embodiment illustrated in FIG. 4. The bracket 110 includes integral apertured ears 114 through which a bolt 116 passes to receive a nut 118.

Each arm 106 is preferably in the form of an ordinary bolt, threaded at one end so as to receive the blade 108 locked in place between a pair or nuts 122. The bolt is headed at 124 at its other end to provide an enlargement which is welded or otherwise rigidly attached to a tubular part 126. An elastomer element 128 is interposed between the bolt 116 and the tubular part 126.

FIG. 7 illustrates a modified embodiment of the invention in which the configuration of the sleeve is altered. The support member 130 is tubular in shape and extends transverse to the direction of travel of the conveyor belt. Secured to the member 130 on its upper surface is an angle section 132 which extends over substantially the entire length of the support member. A sleeve member 134 also in the shape of an angle is adapted to overlie a portion of the angle section 132 and to slide linearly along the central axis of the support member 130. The sleeve 134 includes a pair of inwardly turned end flanges 136 which prevent rotational movement or vertical displacement of the sleeve 134 with respect to the support member 130. A mounting bracket 138 is provided identical in structure to the mounting bracket 42 illustrated in FIG. 5. The bracket 138 is rigidly secured to the sleeve 134 and is adapted to support a wiper blade.

The operation of the embodiment of the invention illustrated in FIGS. 1 through 5 is as follows. The structural arrangement for mounting the support shaft 34 with respect to the conveyor housing 28 has been described and illustrated in FIGS. 2 and 3. This description referes only to the mounting arrangement for one side of the support shaft 34, however the same identical structure is provided on the opposite side of the housing 28. When the shaft 34 is first installed in the conveyor housing the shaft is inserted either through the access door 30 or the door 101. Prior to this operation the plates 64 have been attached to the conveyor housing 28 on each side thereof. Also the plate 88 has been mounted with its end flanges 90 slidably received within the channel members 72. At this time the plate 101 and the upper collar section 102 have been removed. The support shaft 34 is received at each end within the collar section 98 of the bearing support 96 such that the projection 36 lies within the groove 99 and a clearance is provided between the outer diameter of the shaft 34 and the collar section 98. As seen in FIG. 2 the shaft 34 extends outwardly from the bearing support.

Next the individual sleeve members are slid onto the shaft from one end such that the groove 40 is oriented to straddle the projection 36. The actual number of sleeves and wiper blade members which are mounted on the support member will vary depending upon the width of the sleeves and the width of the conveyor belt to be cleaned. The individual sleeve members 38 are arranged such that a sleeve member 38A having an aperture 58A is inserted onto the shaft first. One or more sleeve members 38 are installed on the shaft and finally the sleeve member 38B including an aperture 58B is installed on the shaft. The plate 101 is then inserted into the channel members 72 such that the collar section 102 is positioned overlying the shaft and is then secured to the bearing support 96. The individual sleeve members 38 are arranged such that each sleeve abuttingly engages the adjacent sleeve member. Links 56 are next inserted over the pins 54 to connect adjacent sleeve members for simultaneous movement along the support shaft 34. The flexible cable 60 is positioned such that it extends through the hollow center of the support shaft 34. The end including snap hook 62A is connected to the sleeve 38A through the aperture 58A and the end including snap hook 62B is connected to sleeve 38B through the aperture 58B. As illustrated in FIG. 4 some slack remains in the cable 60 which extends outside the conveyor housing. By means of the cable 60, the connected sleeve members and wiper blade elements 48 are positioned laterally with respect to the return run of the conveyor belt 24 so as to cover substantially the entire width of the conveyor belt.

Next the support member 34 is adjusted vertically with respect to the return run of the conveyor belt 24 such that the blade elements 48 are biased into engagement with the lower surface of the return run. This operation is accomplished by rotating the threaded shaft 80 in a clockwise direction which urges the lateral support 84 upwardly as viewed in FIG. 3. The adjustment procedure is performed on both sides of the housing 28 so as to keep the axis of the support member 34 parallel with the plane of the conveyor belt. The coil springs 94 bias the projections 92 and the plate 88 to which they are connected away from the lateral support 84. Consequently, by raising the support 84 the plate 88 is also raised which raises the bearing member 96 and the support member 34 which is cradled therein. The threaded shafts 80 on each side are rotated until the wiper blades 48 evenly contact the conveyor return run 24. The conveyor is then ready for operation.

After some time period of conveyor belt operation, replacement of the wiper blades will become necessary due to normal wear. This replacement is greatly simplified and the time required drastically reduced by the mounting arrangement of the present invention. Further conveyor belt shutdown is eliminated.

While the conveyor belt continues running the support member 34 is lowered at both ends such that the wiper blades 48 no longer engage the return run 24. The collar section 102 on each side of the housing is then unbolted from the bearing support 96 and the plate 101 is raised and removed. The operator then pulls cable 60 in a manner such that all of the connected sleeve members 38 slide along the support and through the opening 70. The individual sleeves and wiper blades are removed from the shaft one by one after removing the connecting links 56 and disconnecting the cable 60. A corresponding number of sleeves and new wiper blades are then slid onto the support member 34, are connected together by links 56 and are attached to the cable 60. The cable is then energized to position the wiper blades as desired and the plates 101 are replaced and collar sections 102 on each side are bolted to the bearing supports 96. In support member 34 is then raised until the wiper blades 48 contact the return run 24. In a short time and in a relatively simple manner the wiper blades have been replaced without necessitating removal of the support member 34 or shutdown of the conveyor belt.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A mounting arrangement for conveyor belt cleaners including a linearly extending support member positioned transverse to the direction of conveyor belt travel; at least one sleeve member adapted to be concentrically mounted on said support member and slidably carried on said support member for movement linearly along said support member in a direction parallel to a central axis of said support member; means adapted to allow sliding of said concentric sleeve member linearly along said support member, but adapted to prevent rotation of said sleeve about said central axis of said support member, mounting means on said sleeve member adapted to support a belt cleaner blade and means, operable from either side of said conveyor belt for moving said sleeve member linearly along said support member.

2. A mounting arrangement for conveyor belt cleaners as in claim 1 in which a plurality of said sleeve members are slidably carried on said support member adjacent each other and including mounting means on each of said sleeve members adapted to support a belt cleaner blade.

3. A mounting arrangement for conveyor belt cleaners as in claim 2 including connector means linking adjacent sleeve members whereby simultaneous linear movement of the connected sleeve members along said support member is obtained.

4. A mounting arrangement for conveyor belt cleaners as in claim 1 in which said means for moving said sleeve member is a flexible cable connected at each end thereof to a sleeve member.

5. A mounting arrangement for conveyor belt cleaners as in claim 4 wherein said cable extends through said support member.

6. A mounting arrangement for conveyor belt cleaners including a linearly extending support member positioned transverse to the direction of conveyor belt travel; at least one sleeve member adapted to be concentrically mounted on the support member and slidably carried on said support member for movement linearly along said support member in a direction parallel to a central axis of said support member; means associated with said support member adapted to allow sliding of said concentric sleeve member linearly along said support member but adapted to prevent rotation of said sleeve about said central axis of said support member, mounting means on said sleeve member adapted to support a belt cleaner blade, adjustment means to vary the distance between said cleaner blade and said conveyor belt, said adjustment means including a mounting plate having an aperture for passage of an end of the support member, upper and lower bearing support plates on the mounting plate mounting said end of the support member, channel members confining said bearing support plates for vertical movements, a support beneath the lower bearing support plate, one or more springs between the lower bearing support plate and said support, and a threaded adjustment device mounted for moving said support and the bearing support plates with said end of the support member up or down.

7. A mounting arrangement for conveyor belt cleaners including a linearly extending support member positioned transverse to the direction of conveyor belt travel; one or more sleeve members mounted on said support member said sleeve members extending laterally of the conveyor belt the entire width thereof and covering and protecting said portion of said support member disposed beneath said conveyor belt from deposits of material dropped from said belt being cleaned, means mounting said support member at at least one end thereof so as to allow each of said sleeve members to be slidably carried on said support member for movement linearly along said support member and off said support member in a direction parallel to a central axis of said support member; means adapted to allow sliding of each of said sleeve members linearly along said support member, but adapted to prevent rotation of each of said sleeve members about said support member and mounting means on each said sleeve member adapted to support a belt cleaner blade.

8. A mounting arrangement for conveyor belt cleaners as in claim 7 in which a plurality of said sleeve members are slidably carried on said support member adjacent each other.

9. A mounting arrangement for conveyor belt cleaners as in claim 8 including connector means linking adjacent sleeve members whereby simultaneous linear movement of said connected sleeve members along said support member is obtained by movement of any individual sleeve member.

10. A mounting arrangement for conveyor belt cleaners as in claim 7 including cable means connectable to at least one of said sleeve members for moving said sleeve member linearly along said support member.

* * * * *